United States Patent
Sittner

[11] Patent Number: 5,839,222
[45] Date of Patent: Nov. 24, 1998

[54] APPARATUS AND METHOD FOR INCREASING PLANT ROOT DENSITY AND MEASURING PLANT GROWTH

[76] Inventor: Jess Sittner, P.O. Box 714, 1542 Esther Dr., Arnold, Mo. 63010

[21] Appl. No.: 788,327

[22] Filed: Jan. 27, 1997

[51] Int. Cl.⁶ .................................................. A01G 17/00
[52] U.S. Cl. ...................... 47/25; 47/23; 47/43; 47/48.5
[58] Field of Search .................................. 47/23, 25, 42, 47/43, 48.5

[56] References Cited

U.S. PATENT DOCUMENTS

| | | | |
|---|---|---|---|
| 3,005,287 | 10/1961 | Dudley | 47/48.5 |
| 3,408,260 | 10/1968 | Feldman et al. | 47/48.5 |
| 4,308,688 | 1/1982 | Revane | 47/25 |
| 4,336,666 | 6/1982 | Caso | 47/25 |
| 4,502,244 | 3/1985 | Yoham | 47/25 |
| 4,627,191 | 12/1986 | Bergere | 47/48.5 |
| 4,658,737 | 4/1987 | Weissberg | 47/42 |
| 4,986,025 | 1/1991 | Imperial | 47/2 |
| 5,085,001 | 2/1992 | Crawley | 47/25 |
| 5,117,582 | 6/1992 | Cissel, Jr. et al. | 47/48.5 |
| 5,142,818 | 9/1992 | Weigert | 47/25 |
| 5,442,891 | 8/1995 | Albrecht | 47/25 |
| 5,477,639 | 12/1995 | Smith | 47/58 |
| 5,528,855 | 6/1996 | Kapphahn | 47/25 |
| 5,581,935 | 12/1996 | Anderson | 47/25 |
| 5,711,106 | 1/1998 | Ellis . | |

*Primary Examiner*—Peter A. Nelson
*Attorney, Agent, or Firm*—Kevin L. Klug

[57] ABSTRACT

An apparatus for increasing plant root density and measuring plant growth having an inverted T-shaped retaining wall forming a substantially elliptic area into which nutrient rich material may be placed and covered in order to keep the nutrient rich material moist and encourage the growth of a fibrous root mass. Mounted onto the apparatus is one or more feeding pockets which allow watering and fertilizing of the nutrient rich material without removal of the cover and one or more growth indicators which allow for measurement of the progress of plant growth.

20 Claims, 6 Drawing Sheets

Figure 7

APPARATUS AND METHOD FOR INCREASING PLANT ROOT DENSITY AND MEASURING PLANT GROWTH

BACKGROUND OF THE INVENTION

The present invention relates in general to devices which encourage tree, shrub and plant root growth and provide protection of such. It pertains, more particularly, to a device which fits at the base of a tree, shrub, bush or plant and promotes root health and growth and also allows for measurement of the growth rate of the tree, shrub, bush or plant.

It has long been recognized that the roots of a tree, shrub or bush grow healthiest and most dense in a moist rich potting type soil or nutrient rich material. Substitution of any other soil even with a rich addition of nitrogen, potassium and/or phosphorous does not provide the desired root density, health or plant growth rate that a rich and moist potting soil does. Unfortunately, the properties of many conventional nutrient rich soils allow them to dry quickly when exposed to the sun and wind. This prohibits the placing of such soil at the base of a tree, bush or shrub without a means to ensure that moisture is retained within the soil. If moisture is retained within the soil, a mass of fibrous roots will develop within the soil such that the healthiest possible plant may develop.

Although the prior art is replete with conventional devices which administer fertilizer to plant roots, none of the prior art devices provide a method for easy introduction of potting type soil into a plant's fibrous root base or a method for promoting a fibrous root mass above the current root mass, along with a method for measuring the growth rate of the plant all within a device which is secure and structurally sound.

It is thereby an objective of the present invention to provide an apparatus and method for providing a continuous and rich supply of potting soil or nutrient rich material to the topmost roots of a tree, shrub, bush or plant and to encourage the formation of a fibrous root mass without affecting the health or growth of the plant and without the need for removing soil from the existing root structure of the plant.

Another object of the present invention is to provide watering and fertilizer pockets within the device which allow water and fertilizer to reach the root mass contained within the rich potting soil.

A further object of the present invention is to provide one or more integrally attached tree growth indicators which are capable of showing the progress of the plant's trunk diameter growth.

A still further object of the present invention is to provide for the protection of the plant's trunk when mowing is performed near the device and also eliminate the need for trimming around the device after mowing around its base.

A still further object of the present invention is to provide for convenient and secure mounting of the device without using nails, spikes or any other external attachments.

A still further object of the present invention is to provide for the introduction of mulch on the topmost surface of the device that it may present a cosmetically appealing appearance and allow for the nutrients in the mulch to gradually be absorbed into the underlying potting soil.

A still further object of the present invention is to inhibit weed growth around the base of the plant which the device is used in conjunction with.

A still further object of the present invention is to provide a device which is lengthwise adjustable for any grouping of trees, shrubs and/or bushes.

A still further object of the present invention is to provide feeding pockets which allow water and fertilizer to feed the fibrous root mass directly.

SUMMARY OF THE INVENTION

To accomplish the foregoing and other objects of this invention there is provided an apparatus and method for increasing plant root density and measuring plant growth by providing a device containing an easily accessible growth area rich in potting soil or other nutrient rich material with an attached growth indicator. The apparatus consists of a retaining wall of substantially inverted T-shape which adjustably surrounds the base of a tree, shrub or bush and thereby provides an area into which potting soil may be deposited. Attached to the outermost and innermost edge of the inverted T-shaped retaining wall is a substantially perpendicular anchoring lip attached to each bottommost edge of the inverted T-shaped retaining wall. The lip pushes into the surrounding soil and ensures that the device will not move while in use. Attached onto the innermost wall of the inverted T-shaped retaining wall within the cavity is at least one feeding pocket with holes at its base and side which allow water and fertilizer to permeate directly into the potting type soil and fibrous root mass contained within the area when such water and fertilizer are placed into the pocket.

At least one growth indicator is also attached onto the innermost wall of the inverted T-shaped retaining wall. The growth indicator is comprised of a height adjustable indicator mount attached to the innermost wall of the inverted T-shaped retaining wall with a short tubular member mounted perpendicular and onto said mount. A growth indicating rod is placed through the tubular member and is abutted against the trunk of a tree. As the tree grows, the growth indicating rod will be pushed outward, and show the progress of the tree growth. In a preferred embodiment, the growth indicating rod would contain indicia which would show growth relative to an end of the tubular member.

Moisture is retained in the potting soil contained within the cavity by placing a cover over the topmost layer of the potting soil. The cover is formed such that it fits within the boundary defined by the inverted T-shaped retaining wall, the growth indicators and the feeding pockets. This defined boundary may have various shapes as described later in this section. The cover fits snugly into this defined area and abuts the topmost layer of the potting soil. The snug fit limits the amount of moisture which may escape from the underlying potting soil. The cover is formed into two or more parts and contains one or more cutouts through which a plant may grow. The parts are formed such that each part may be separated such that the cover may be placed around the trunk or base of the plant.

In its most basic form, the inverted T-shaped retaining wall is shaped into a circular form from two half circular sections by placing each half circular section around the trunk or base of the plant. Each section is then connected and secured to the other with the integral male-female snap locks which are formed onto the mating ends of each half circular section. In this configuration, the cover is circular in shape with appropriate notches for the feeding pockets and growth indicators.

A unique aspect of the present invention is its expandability. Between each afformentioned half circular section may be placed two or more sections of linear inverted T-shaped retaining wall extenders which also contain one or more substantially perpendicular anchoring lips. Each linear inverted T-shaped retaining wall extenders also contain integral male-female snap locks which adjoin and secure to the snap locks of each half circular section. When used with the inverted T-shaped retaining wall extenders, the present invention will require an elliptical cover with the appropriate notches for the feeding pockets and growth indicators.

An alternative embodiment of each half circular section may take the shape of a half rectangular or square section. In this configuration, the cover is rectangular or square in shape with appropriate notches for the feeding pockets and growth indicators. Again, the linear inverted T-shaped retaining walls may be used for expandability.

The present invention can be manufactured of different materials, sizes and colors. In one preferred embodiment, the apparatus is comprised of a polymer-type material.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Referring now to the drawings there is shown a preferred embodiment in FIGS. 1–4 of the apparatus for increasing plant root density and measuring plant growth. The apparatus for increasing plant root density and measuring plant growth is described in connection with an in-ground tree and associated root structure.

In a preferred embodiment, the apparatus for increasing plant root density and measuring plant growth 10 comprises a substantially inverted T-shaped retaining wall 12 having an outermost edge 13, an innermost edge 15, and a retaining panel 17 located between the two edges 13,15. Attached to one or more of the edges 13,15 or therebetween is one or more anchoring lips 30 which are preferably attached in a substantially perpendicular fashion but may be attached non-perpendicularly. Each anchoring lip 30 is preferably formed from a flat material of 0.125 to 4 inches in width but may also be formed from spikes, tubes or dowels which are capable of being attached to the apparatus 10 and anchoring it to the ground. The retaining wall 12 is capable of retaining potting soil or other nutrient rich material within a substantially elliptical and often circular area 40 bounded by the retaining wall 12. The area 40 is formed when a substantially first half circular section 36, having a convex and a concave side, and a substantially second half circular section 38, also having a convex and a concave side, are releasably joined together in order to form a full circular or elliptic bounded area 40. A preferred embodiment of each half circular section 36,38 also contains a shoulder 19 of substantially flat material which allows each half circular section 36,38 to properly seat and align with each other.

Figure 1:
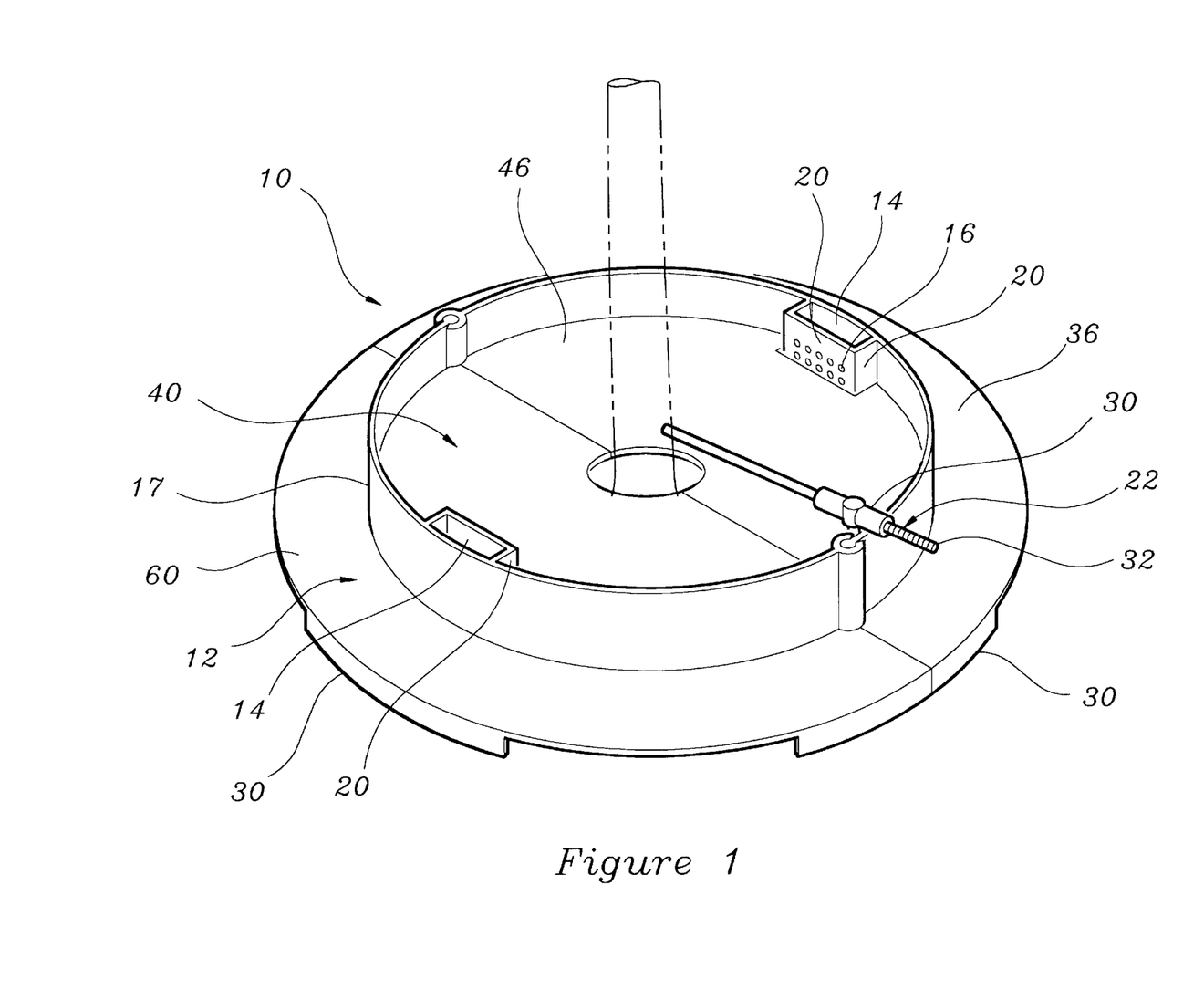
FIG. 1 is a perspective view of a preferred embodiment of the apparatus for increasing plant root density and measuring plant growth surrounding a tree trunk with the removable cover in place.
Figure 2:
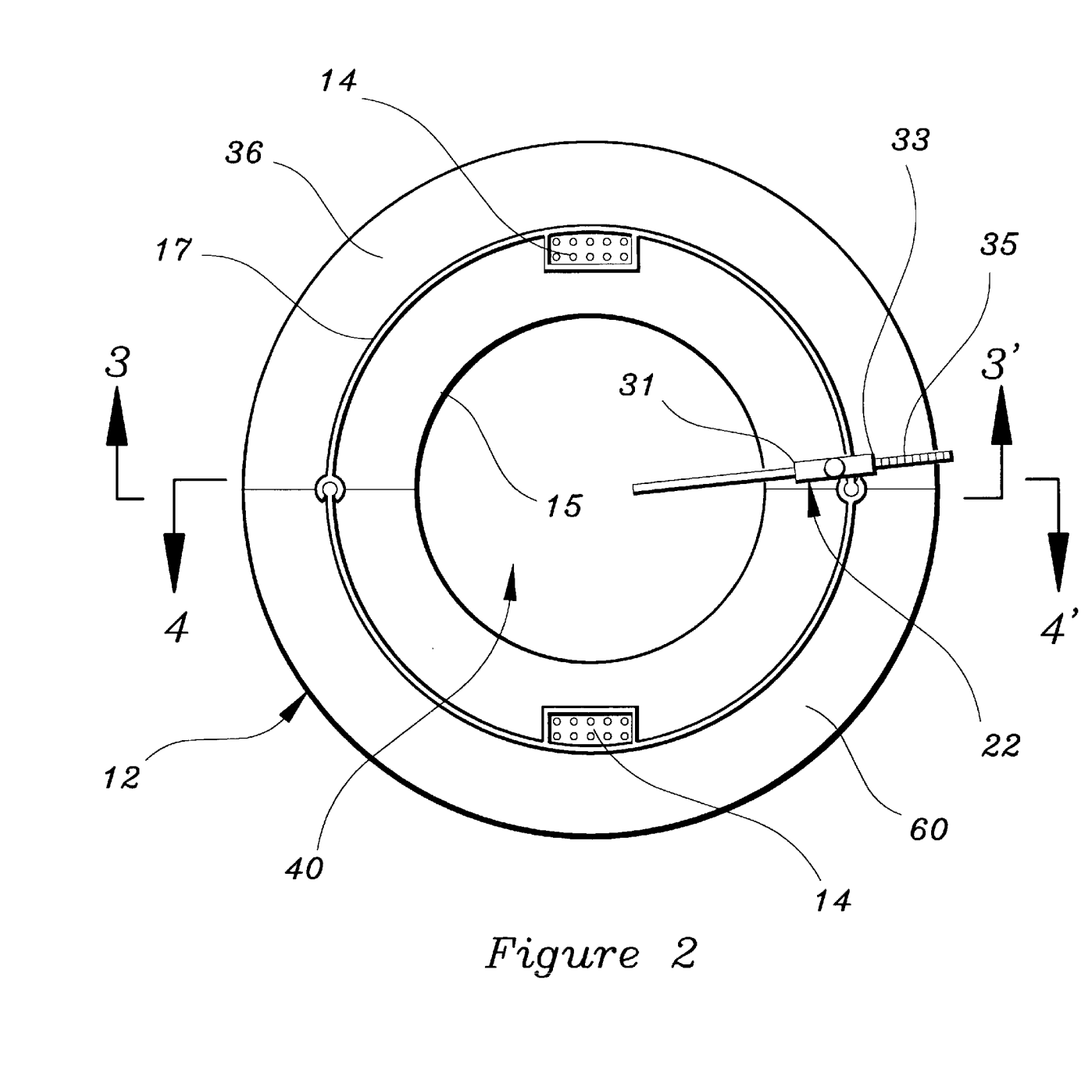
FIG. 2 is a plan view of the preferred embodiment of the apparatus for increasing plant root density and measuring plant growth without the cover in place.
Figure 3:
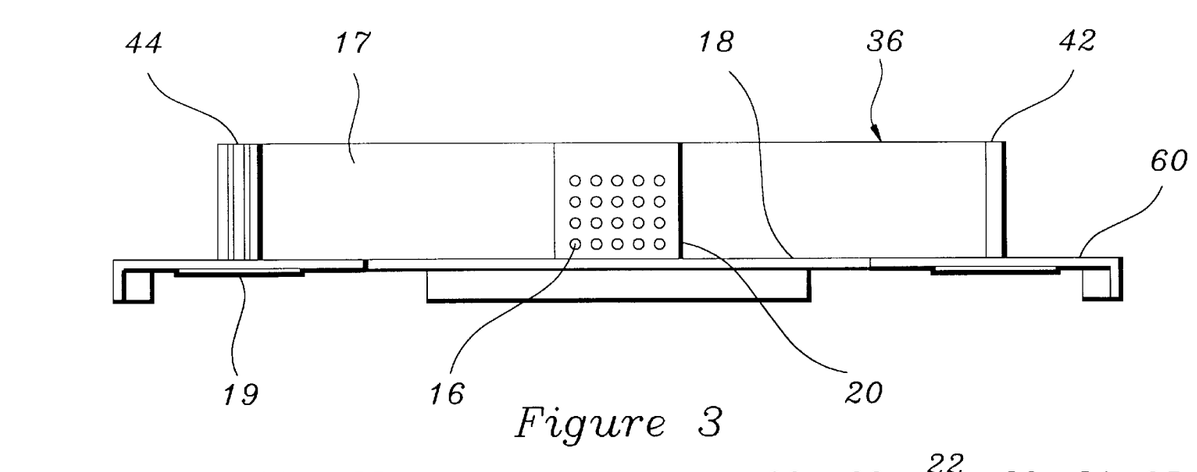
FIG. 3 is a side view of the preferred embodiment of the apparatus for increasing plant root density and measuring plant growth taken across line 3-3' and showing a first half circular section.
Figure 4:
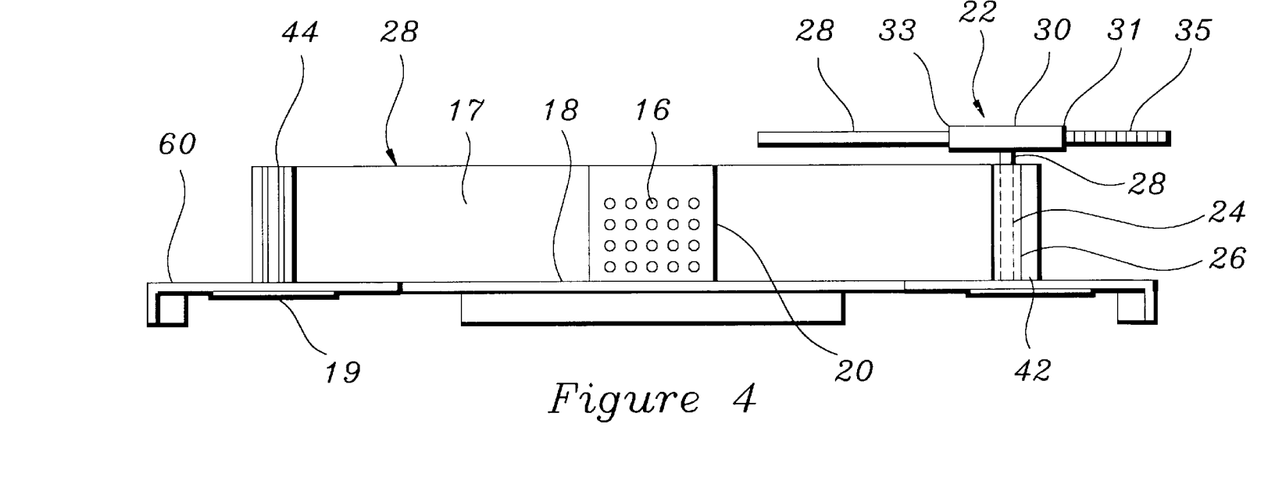
FIG. 4 is a side view of the preferred embodiment of the apparatus for increasing plant root density and measuring plant growth taken across line 4-4' and showing a second half circular section.

Within the area 40 bounded by the retaining wall 12 and attached thereto, on its inner circumference, is one or more feeding pockets 14. Each feeding pocket 14 contains one or more irrigation holes 16 at its base 18 and sides 20. The feeding pockets 14 allow for water and fertilizer to be provided to the plant and surrounding soil.

Also attached on the innermost surface of the retaining panel 17 is one or more growth indicators 22. Although not shown in the preferred embodiment, the growth indicators 22 may also be attached to other portions of the inverted T-shaped retaining wall. Each growth indicator is attached to the innermost circumference with a height adjustable indicator mount 24. The mount 24 allows the apparatus of the growth indicator to be height adjusted for optimum measurement of tree or plant growth. The mount 24 is comprised of a substantially tubular member 26 into which is inserted a cylindrical support rod 28 and held via the frictional contact between the two members. Although the mount 24 is described with cylindrical and tubular portions, each portion may take on any shape such as octagonal, rectangular or square. Onto the topmost portion of the cylindrical support rod, a perpendicular tubular member 30 is mounted. The perpendicular tubular member 30 is comprised of a tube with an outside end 31 and inside end 33. A growth indicating rod 32 is inserted into the perpendicular tubular member 30 and lightly held via the frictional forces between the perpendicular tubular member 30 and the growth indicating rod 32. The growth indicating rod 32 is positioned to make intimate contact with the tree or other plant which requires growth rate measurement. As the tree or other plant grows, it pushes the growth indicating rod 32 out of the tubular member 30 which allows monitoring of the plant growth process. In a preferred embodiment, the growth indicating rod 32 will contain one or more indicia 35 which will provide a convenient method of directly measuring the growth rate of the plant by marking and recording said indicia relative to the outside end 31 or inside end 33 of the perpendicular tubular member 30.

In a preferred embodiment, the topmost view of the inverted T-shaped retaining wall 12 shows a structure which closes upon itself and forms a circular or elliptical shape. The shape is most definitely elliptical when the linear inverted T-shaped retaining wall extenders 34 are inserted between the first half circular section 36 and the second half circular section 38 as depicted in the alternative embodiment FIG. 5. Each linear inverted T-shaped retaining wall extender 34 may also contain feeding pockets 14 and growth indicators 22 mounted onto it within the area 40 which is bounded by it.

Figure 5:
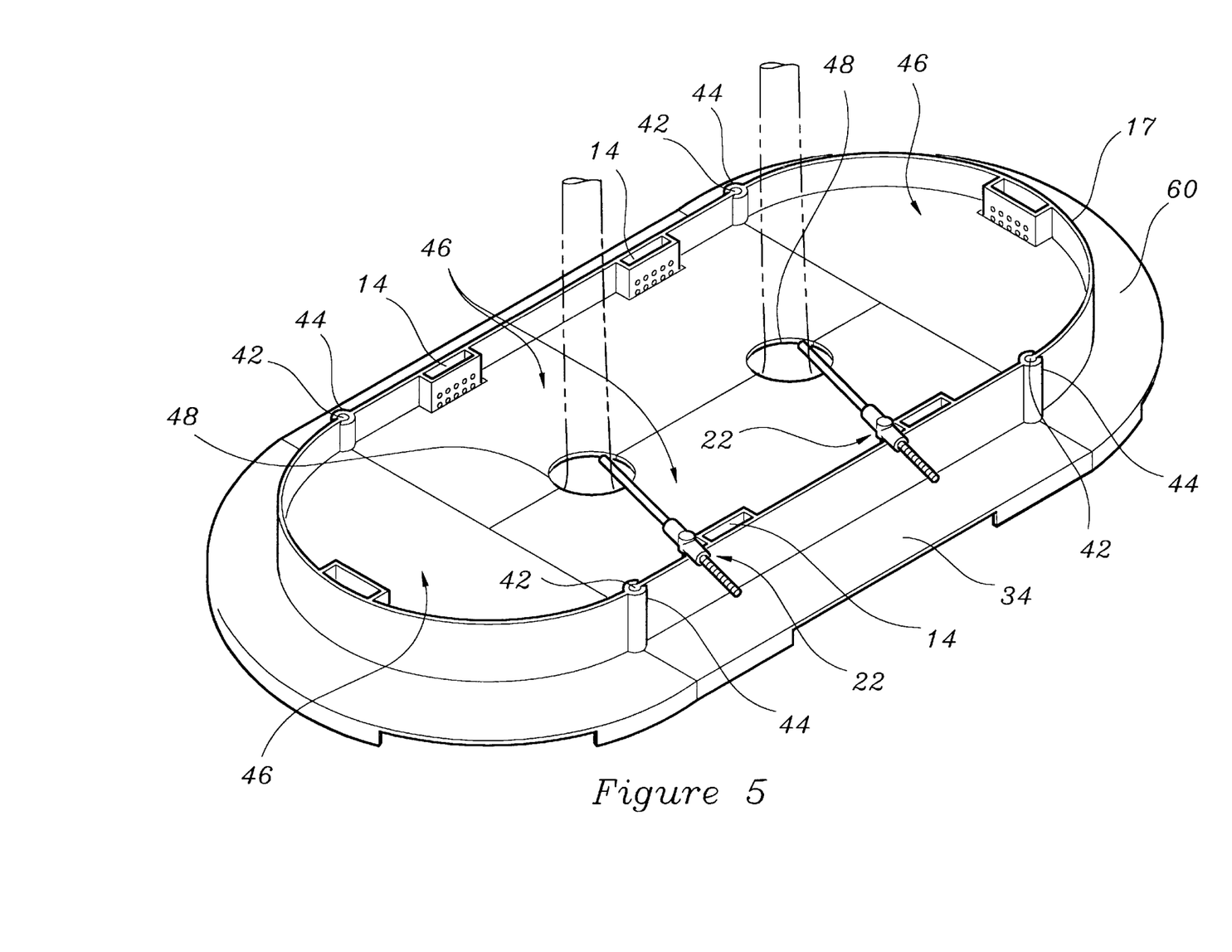
FIG. 5 is a perspective view of an alternative embodiment shown with the linear Inverted T-shaped retaining wall extender members inserted.

In the preferred embodiment and the alternative embodiment of FIG. 5, each linear inverted T-shaped retaining wall extender 34 and each first and second half circular section 36,38 are attached to each other via the interlocking action of a male snaplock 42 and a female snaplock 44. Onto each first half circular section 36 is mounted a male snaplock 42 at one interface point and a female snaplock 44 at the other interface point. The second half circular section 38 also contains a male snaplock 42 at one interface point and a female snaplock 44 at the other interface point in such an order that they will mate with the opposite sex snaplock of the first half circular section 36.

In the alternative embodiment of FIG. 5, each linear inverted T-shaped retaining wall extender 34 will also contain a female snaplock 44 at one end and a male snaplock 42 at the other end. Each snaplock 42,44 is positioned so that any feeding pocket 14 or growth indicator 22 attached to the linear inverted T-shaped retaining wall extender 34 is positioned within the area 40 where potting soil is retained. That is, snaplock mating (male to female) will occur at the interface of the linear inverted T-shaped retaining wall extender 34 and each of the first and second half circular sections 36, 38 such that any feeding pocket 14 or growth indicator 22 will be positioned within the area 40 containing potting soil.

In the preferred and alternative embodiments, a removable cover 46 is placed within the area 40 and substantially covers the potting soil that moisture may be retained and weed growth within the potting soil may be prevented. The cover 46 is substantially flat in shape and is formed into parts which fit snugly against the retaining panels 17, feeding pockets 14 and growth indicators 22. That is, when the feeding pockets 14 and/or the growth indicators 22 are present, the removable cover 46 has indentations in its periphery which accommodates the shape of each. The cover 46 is formed of two or more pieces, i.e. halves, quarters, etc., and contains at least one cutout 48 for plant placement. Each piece allows the portions of the cover 46 surrounding the slit 52 to be separated that the cover 46 may be placed around the trunk or base of the tree, shrub, bush or plant. The cutouts 48 are to be trimmed and expanded by the user as the tree base grows. If the linear inverted T-shaped retaining wall extenders 34 are utilized in an alternative embodiment, the removable cover 46 will have an elliptical rather than circular shape and the cutout(s) 48, slit(s) 52, series of concentric slices 50, and concentric rings 54 will be defined and created by the user using conventional household cutting devices.

Figure 6:
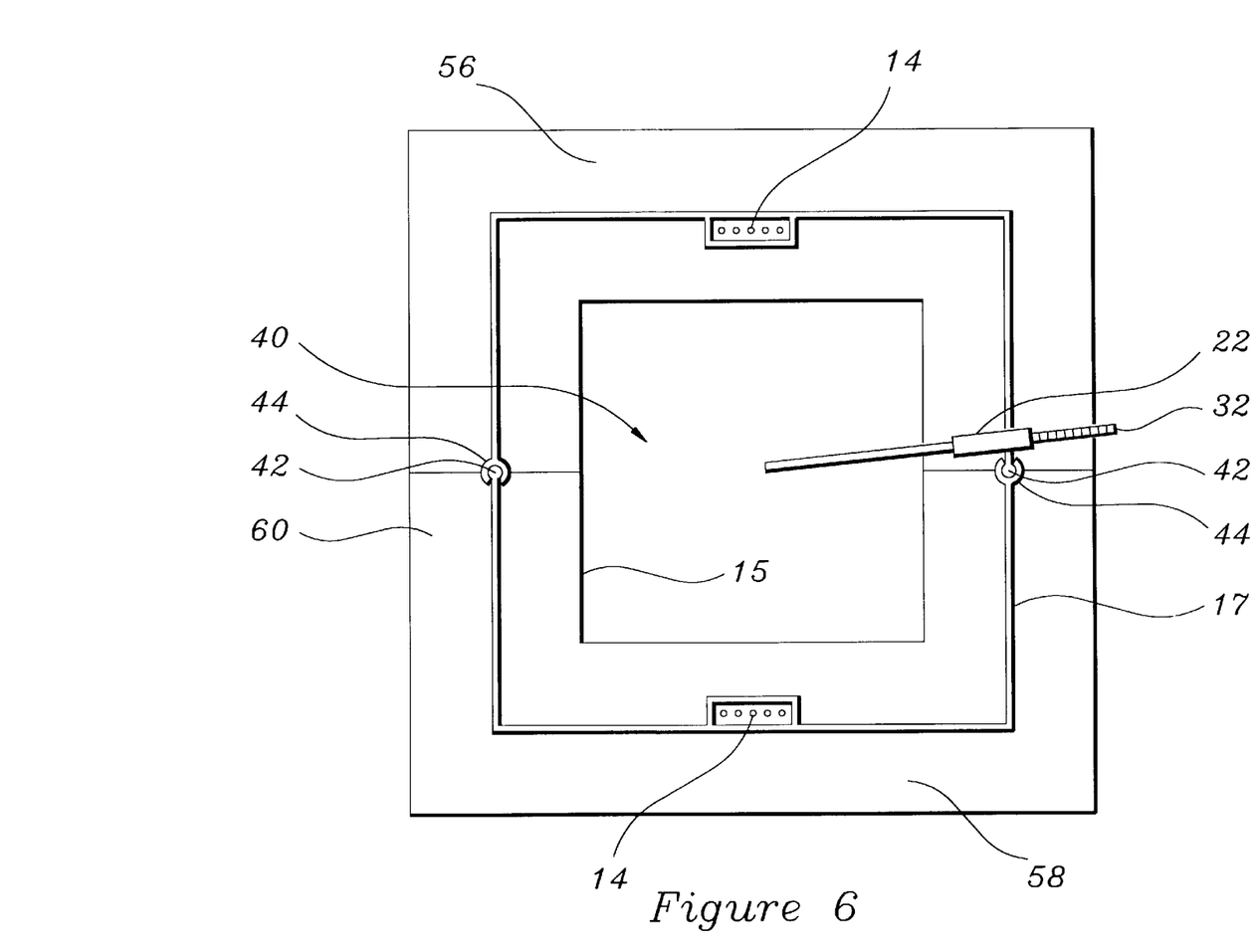
FIG. 6 is a plan view of an alternative embodiment with a substantially rectangular shape.
Figure 7:
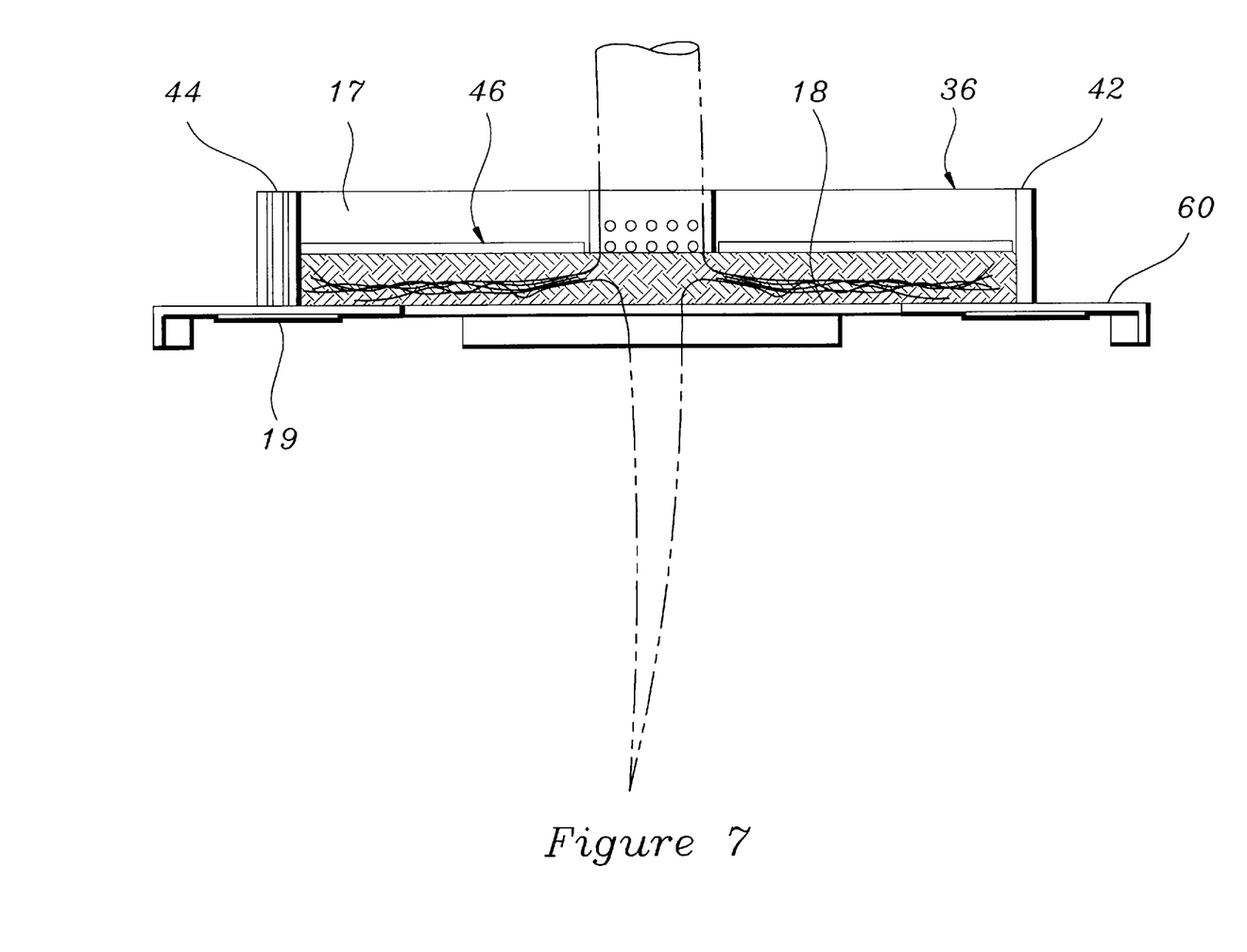
FIG. 7 is a side view of the preferred embodiment of the apparatus for increasing plant root density and measuring plant growth taken across line A-A' and showing a first half circular section with the cover, fibrous root mass and soil in place.

An alternative embodiment as shown in FIG. 6, provides all of the features and benefits of the preferred embodiment of FIGS. 1–4, including feeding pockets 14, perpendicular anchoring lip 30, growth indicator 22 and removable cover 46 except that the inverted T-shaped retaining wall 12 is formed into a substantially rectangular shape. Other alternative embodiments could be shaped in practically any shape which defines a polygon type shape. The substantially rectangular shape is formed from a first half rectangular section 56 and a second half rectangular section 58 which are connected and joined as the preferred embodiment with a male snaplock 42 and a female snaplock 44 at each of the respective mating points. In other alternative embodiments each half section could form substantially half of any type of polygon. The linear inverted T-shaped retaining wall extenders 34 may also be placed between each first half rectangular section 56 and each second half rectangular section 58 that the alternative embodiment may be expanded. Within each area 40 defined by the inverted T-shaped retaining wall 12 within the alternative embodiment may also be placed a removable cover 46 which incorporates all of the features and functions of that within the preferred embodiment.

The apparatus for increasing plant root density and measuring plant growth 10 along with its alternative embodiments can be comprised of a variety of materials, including but not limited to, a metallic-type material, a waterproof cardboard, or even tar paper, although a polymer-type material is preferred. Also, in some embodiments, the mulch pad ring can be comprised of a moisture permeable material which allows moisture to substantially penetrate the apparatus 10 and the removable cover 46.

In operation, for both preferred and alternative embodiments, each first half section 36,56 and each second half section 38,58 are joined around the base of a tree, shrub or bush such that each male snaplock 42 and female snaplock 44 are integrally mated, thereby connecting each first half section 36,56 and each second half section 38,58. Upon connection the anchoring lips 30 of the combined sections are firmly pushed into the ground surrounding the plant in order to secure the apparatus and prevent movement. A supply of potting soil or other nutrient rich growth material is then placed within the area 40. The amount placed with the area 40 is entirely dependent upon the quantity of fibrous root mass which is desired. That is, the more potting soil or other nutrient rich growth material which is placed within the area 40, the greater the volume of fibrous root mass.

After a supply of potting soil or other nutrient rich growth material is placed within the area 40, a removable cover 46 is placed around the base of the tree, shrub, bush or plant by placing each separate part of said cover around said plant and into said cutout 48. The cutout 48 may require trimming in order to conform to the size which is required.

Once the removable cover 46 is placed around the base of the tree, shrub or bush, it is gently pushed into the area 40 defined by the inverted T-shaped retaining wall 12 and seated upon the supply of potting soil or other nutrient rich material within the area 40. The cover 46 will ensure that moisture is retained within the potting soil which is placed into the area 40 since it fits snugly with the inverted T-shaped retaining wall 12, feeding pockets 14 and growth indicator 22.

After the removable cover 46 is in place, the growth indicating rod 32 is placed through the perpendicular tubular member 30 until it abuts onto the trunk of the tree, shrub or bush. Once it has abutted the trunk, the user may physically mark the growth indicating rod 32 at the outside end 31 or inside end 33 and watch the mark physically move as the plant grows over time in order to record the growth of the plant. The user may also record the position of the indicia 35 relative to the outside end 31 or inside end 33 and keep a log of the movement of the indicia 35 position.

When the user determines that the plant or soil surrounding the plant needs water or fertilizer, he or she will place said water or fertilizer or both into the one or more feeding pockets 14. The water and/or fertilizer will flow into the potting soil or other nutrient rich growth material placed into area 40 through the irrigation holes 16 placed into the base 18 and sides 20 of each feeding pocket 14. The fertilizer may be selected in a dry pellet or particle form which is larger than the irrigation holes 16 within the feeding pocket 14. This will allow the fertilizer to slowly leach through the irrigation holes 16 and into the surrounding soil as the pellets or particles dissolve. By watering and feeding through the feeding pockets 14, the user eliminates the necessity of removing the removable cover 46 and disturbing the settings of the growth indicator 22.

Should the user require an elongated area 40 in which one or more trees may be enclosed, he or she may place a pair of linear inverted T-shaped retaining wall extenders 34 between each first half section 36,56 and each second half section 38,58 and join them thereto with the integral male snaplock 42 and female snaplock 44. Upon assembly, the user will again position the one or more growth indicators 22 as previously described for each plant which is enclosed. The removable cover 46 for this embodiment, will require custom cutting and fitting by the user. That is, the removable cover 46 for this embodiment is formed to fit the area 40 enclosed by the linear inverted T-shaped retaining wall extenders 34 and each first half section 36,56 and each second half section 38,58, but does not contain the cutout(s) 48 which must be defined and created by the user using conventional houshold cutting devices. Furthermore, the user will be required to form and cut each part of the cover 46 as he or she desires to provide the proper fit. As with all embodiments the cutout 48 must be trimmed to correspond to the trunk diameter of the tree(s) or shrub(s) or plant(s).

When properly placed around the trunk of the tree or shrub, the apparatus for increasing plant root density and measuring plant growth 10 provides a ledge 60 for the movement of lawn care equipment thereby preventing interference with the potting soil or base of the plant which it surrounds. This allows a conventional lawn mower to cut the grass surrounding the apparatus for increasing plant root density and measuring plant growth 10 by rolling over said ledge 60 and trimming said grass bordering and surrounding the apparatus 10 without the use of a conventional weed trimmer.

From the foregoing description those skilled in the art will appreciate that all objects of the present invention are realized. An apparatus for increasing plant root density and measuring plant growth has been shown and described which permits a fibrous and highly dense root mass to form at the base of a plant and provide water, nutrients, proper feeding and monitoring of the growth of said plant all while providing a ledge to facilitate movement of lawn care equipment around the apparatus without substantially interfering with the operation of said apparatus.

The apparatus of this invention is capable of retaining moisture in the potting soil or other nutrient rich growth material which allows the roots of the plant to penetrate into the potting soil or other nutrient rich growth material while minimizing the growth of weeds within the area covered by the base panel. The preferred design of the present invention, as well as alterations that will now be apparent to those skilled in the art, all allow use of the apparatus with any tree, shrub or bush.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. An apparatus for increasing plant root density and measuring plant growth comprising:
    an inverted T-shaped retaining wall having an outermost edge, an innermost edge, a retaining panel attached and located between said outermost edge and said innermost edge and a ledge defined by the area between said retaining panel and said outermost edge; and one or more anchoring lips mounted onto said inverted T-shaped retaining wall which are capable of anchoring said retaining wall to the ground;
    said inverted T-shaped retaining wall formed into a first substantially half circular section, having a convex side and a concave side and a second substantially half circular section having a convex side and a concave side;
    said concave side of said first substantially half circular section releasably connected with said concave side of said second substantially half circular section, thereby forming an elliptic area bounded by said retaining panel into which potting soil or other nutrient rich growth material may be placed; and
    a removable cover of substantially flat material formed to fit within said elliptic area bounded by said retaining panel and seat against said potting soil or other nutrient rich growth material;
    said removable cover having a periphery and a cutout whereby the base of a tree, shrub or bush may be inserted therethrough.

2. An apparatus for increasing plant root density and measuring plant growth as defined in claim 1 further comprising:
    a growth indicator mounted onto said retaining panel whereby the rate of growth of the plant may be measured.

3. An apparatus for increasing plant root density and measuring plant growth as defined in claim 2 said growth indicator further comprising:
    a mount of substantially tubular form attached to said retaining panel, a support rod having a first and second end, a perpendicular tubular member and a growth indicating rod,
    said first end of said support rod frictionally held within the substantially tubular form of said mount; and
    said perpendicular tubular member attached to said second end of said support rod and said growth indicating rod inserted through said perpendicular tubular member whereby said growth indicating rod may contact a plant and measure growth.

4. An apparatus for increasing plant root density and measuring plant growth as defined in claim 3 further comprising:
    One or more feeding pockets having a base, one or more sides and one or more irrigation holes,
    said feeding pockets attached to said retaining panel nearest said innermost edge of said inverted T-shaped retaining wall, whereby water and fertilizer may be placed into said pockets and flow into said potting soil or other nutrient rich growth material through the one or more irrigation holes; and
    said removable cover further comprising one or more indentations nearest its periphery whereby said removable cover may accommodate said feeding pockets and fit within said elliptic area bounded by said retaining panel and seat against said potting soil or other nutrient rich growth material.

5. An apparatus for increasing plant root density and measuring plant growth as defined in claim 4:
    said first substantially half circular section further comprising a female snaplock attached to a leftmost portion of said concave side onto said retaining panel and a male snaplock attached to a rightmost portion of said concave side onto said retaining panel; and
    said second substantially half circular section further comprising a female snaplock attached to a leftmost portion of said concave side onto said retaining panel and a male snaplock attached to a rightmost portion of said concave side onto said retaining panel;

whereby said male snaplock attached to said first substantially half circular section releasably connects and holds with said female snaplock attached to said second substantially half circular section and said female snaplock attached to said first substantially half circular section releasably connects and holds with said male snaplock attached to said second substantially half circular section when said concave side of said first substantially half circular section connects with said concave side of said second substantially half circular section.

6. An apparatus for increasing plant root density and measuring plant growth as defined in claim 5 further comprising:

said one or more anchoring lips mounted onto said innermost edge and said outermost edge of said inverted T-shaped retaining wall, said one or more anchoring lips capable of anchoring said retaining wall to the ground.

7. An apparatus for increasing plant root density and measuring plant growth as defined in claim 6 said removable cover further comprising:

at least two separable parts whereby each part of said removable cover may be placed around one or more plants.

8. An apparatus for increasing plant root density and measuring plant growth comprising:

an inverted T-shaped retaining wall having an outermost edge, an innermost edge and a retaining panel attached perpendicularly and located between said outermost edge and said innermost edge; and one or more anchoring lips mounted between said outermost edge and said innermost edge which are capable of anchoring said retaining wall to the ground;

said inverted T-shaped retaining wall formed into a first substantially half circular section, having a convex side and a concave side and a second substantially half circular section having a convex side and a concave side;

said concave side of said first substantially half circular section releasably connected with said concave side of said second substantially half circular section, thereby forming a circular area bounded by said retaining panel into which potting soil or other nutrient rich growth material may be placed; and a removable cover of substantially flat material and circular form, formed to fit within said circular area bounded by said retaining panel and seat against said potting soil or other nutrient rich growth material;

said removable cover having a periphery which snugly contacts said retaining wall and a cutout whereby the base of a tree, shrub, bush or plant may be inserted therethrough.

9. An apparatus for increasing plant root density and measuring plant growth as defined in claim 8 further comprising:

a growth indicator mounted within said circular area and onto said retaining panel whereby the rate of growth of the plant may be measured.

10. An apparatus for increasing plant root density and measuring plant growth as defined in claim 9 said growth indicator further comprising:

a mount of substantially tubular form vertically attached to said retaining panel within said circular area, a support rod having a first and second end, a perpendicular tubular member and a growth indicating rod, said first end of said support rod frictionally held vertically within the substantially tubular form of said mount; and said perpendicular tubular member rigidly attached to said second end of said support rod and said growth indicating rod inserted through said perpendicular tubular member whereby said growth indicating rod may contact a plant and move toward said outermost edge as said plant grows.

11. An apparatus for increasing plant root density and measuring plant growth as defined in claim 10 further comprising:

One or more feeding pockets having a base, one or more sides and one or more irrigation holes, said feeding pockets attached to said retaining panel nearest said innermost edge of said inverted T-shaped retaining wall, whereby water and fertilizer may be placed into said pockets and flow into said potting soil or other nutrient rich growth material through the one or more irrigation holes; and said removable cover further comprising one or more indentations nearest its periphery whereby said removable cover may snugly contact said feeding pockets and said retaining panel and seat against said potting soil or other nutrient rich growth material.

12. An apparatus for increasing plant root density and measuring plant growth as defined in claim 11:

said first substantially half circular section further comprising a female connector attached to a leftmost portion of said concave side onto said retaining panel and a male connector attached to a rightmost portion of said concave side onto said retaining panel; and said second substantially half circular section further comprising a female connector attached to a leftmost portion of said concave side onto said retaining panel and a male connector attached to a rightmost portion of said concave side onto said retaining panel;

whereby said male connector attached to said first substantially half circular section releasably connects and holds with said female connector attached to said second substantially half circular section and said female connector attached to said first substantially half circular section releasably connects and holds with said male connector attached to said second substantially half circular section when said concave side of said first substantially half circular section is aligned and connected with said concave side of said second substantially half circular section.

13. An apparatus for increasing plant root density and measuring plant growth as defined in claim 12 said removable cover further comprising:

at least two separable parts whereby each part of said removable cover may be placed around one or more plants.

14. An apparatus for increasing plant root density and measuring plant growth comprising:

an inverted T-shaped retaining wall having an outermost edge, an innermost edge and a retaining panel attached and located between said outermost edge and said innermost edge; and one or more anchoring lips mounted onto said inverted T-shaped retaining wall which are capable of anchoring said retaining wall to the ground;

said inverted T-shaped retaining wall formed into a first substantially half circular section, having a convex side, a concave side, an attached male connector and an attached female connector; and a second substantially half circular section having a convex side, a concave side, an attached male connector and an attached female connector, whereby when said concave side of said first substantially half circular section is oriented toward and aligned with said concave side of said second substantially half circular section said female connector of said second substantially half circular section is directly opposite and capable of interfacing with said male connector of said first substantially half circular section and said male connector of said second substantially half circular section is directly opposite and capable of interfacing with said female connector of said first substantially half circular section; and two linear inverted T-shaped retaining wall extenders having an outermost edge, an innermost edge, a retaining panel attached and located between said outermost edge and said innermost edge, a male connector attached to a first end and a female connector attached to a second end and one or more anchoring lips mounted onto said linear inverted T-shaped retaining wall extenders which are capable of anchoring said linear retaining wall member to the ground;

said linear inverted T-shaped retaining wall extenders located between said concave sides of said first half circular section and said second half circular section, said male connectors attached to a first end of said linear inverted T-shaped retaining wall extenders each connected with and mated to a said female connector of each of said first half circular section and said second half circular section, said female connectors attached to a second end of said linear inverted T-shaped retaining wall extenders each connected with and mated to a said male connector of each of said first half circular section and said second half circular section, thereby forming an elliptic area bounded by said retaining panel into which potting soil or other nutrient rich growth material may be placed; and a removable cover of substantially flat material and elliptical shape, formed to integrally fit within said elliptic area bounded by said retaining panel of said extenders, said first half circular section and said second half circular section and seat against said potting soil or other nutrient rich growth material;

said removable cover having a periphery and one or more cutouts whereby the base of a tree, shrub, bush or plant may be inserted therethrough.

15. An apparatus for increasing plant root density and measuring plant growth as defined in claim 14 further comprising:

one or more growth indicators mounted onto said retaining panel whereby the rate of growth of the plant may be measured.

16. An apparatus for increasing plant root density and measuring plant growth as defined in claim 15 said growth indicator further comprising:

a mount of substantially tubular form attached to said retaining panel, a support rod having a first and second end, a perpendicular tubular member and a growth indicating rod, said first end of said support rod frictionally held within the substantially tubular form of said mount; and said perpendicular tubular member attached to said second end of said support rod and said growth indicating rod inserted through said perpendicular tubular member whereby said growth indicating rod may contact a plant and measure growth.

17. An apparatus for increasing plant root density and measuring plant growth as defined in claim 16 further comprising:

One or more feeding pockets having a base, one or more sides and one or more irrigation holes, said feeding pockets attached to said retaining panel within said elliptic area bounded by said retaining panel nearest said innermost edge, whereby water and fertilizer may be placed into said pockets and flow into said potting soil or other nutrient rich growth material through the one or more irrigation holes; and said removable cover further comprising one or more indentations nearest its periphery whereby said removable cover may accommodate said feeding pockets and fit within said elliptic area bounded by said retaining panel and seat against said potting soil or other nutrient rich growth material.

18. A method for increasing plant root density and measuring plant growth while inhibiting weed growth around the base of a plant and substantially minimizing interference with lawn care equipment, the steps comprising:

providing a first substantially half polygon type section of inverted T-shaped retaining wall having a convex side, a concave side, an outermost edge, an innermost edge, a retaining panel attached and located between said outermost edge and said innermost edge and a ledge defined by the area between said retaining panel and said outermost edge, providing a second substantially half polygon type section of inverted T-shaped retaining wall having a convex side, a concave side, an outermost edge, an innermost edge, a retaining panel attached and located between said outermost edge and said innermost edge and a ledge defined by the area between said retaining panel and said outermost edge, providing one or more anchoring lips attached to a ground contacting portion of said inverted T-shaped retaining wall, mating and attaching said concave side of said first substantially half polygon type section of inverted T-shaped retaining wall with said concave side of said second substantially half polygon type section of inverted T-shaped retaining wall around the base of a plant to form a substantially polygonal area bounded by said retaining panel, pushing said one or more anchoring lips into the ground to provide anchoring of said first substantially half polygon type section and said second substantially half polygon type section, placing a nutrient rich material within said polygonal area bounded by said retaining panel; and providing a removable cover of substantially flat material and polygonal shape, formed to integrally fit within said polygonal area bounded by said retaining panel, said removable cover having a periphery and one or more cutouts whereby the plant may be inserted therethrough, placing the plant within said cutout and seating said cover upon said nutrient rich material whereby said cover will keep said nutrient rich material moist, allow for the growth of a fibrous root mass, inhibit weed growth in said nutrient rich material and allow for mowing with a conventional lawn mower over said ledge.

19. A method for increasing plant root density and measuring plant growth while inhibiting weed growth around the base of a plant and substantially minimizing interference with lawn care equipment as set forth in claim 18, the steps further comprising:

providing one or more feeding pockets having a base, one or more sides and one or more irrigation holes,     attaching said one or more feeding pockets onto said retaining panel within said polygonal area,     cutting a notch into said removable cover to accommodate said feeding pockets and provide a fit within said polygonal area,     placing water and fertilizer within said feeding pockets to provide nutrients and moisture to said nutrient rich material.

20. A method for increasing plant root density and measuring plant growth while inhibiting weed growth around the base of a plant and substantially minimizing interference with lawn care equipment as set forth in claim 19, the steps further comprising:

mounting a growth indicator onto said inverted T-shaped retaining wall,     contacting said growth indicator with said plant whereby movement in said growth indicator may be observed as said plant grows.

\* \* \* \* \*